US009063719B1

(12) United States Patent
Lam

(10) Patent No.: US 9,063,719 B1
(45) Date of Patent: Jun. 23, 2015

(54) TABLE FORMAT PROGRAMMING

(75) Inventor: Peter Ar-Fu Lam, Torrance, CA (US)

(73) Assignee: People Innovate for Economy Foundation, Inc., Alhambra, CA (US)

( * ) Notice: Subject to any disclaimer, the term of this patent is extended or adjusted under 35 U.S.C. 154(b) by 0 days.

(21) Appl. No.: 09/419,752

(22) Filed: Oct. 16, 1999

Related U.S. Application Data

(63) Continuation-in-part of application No. 08/538,426, filed on Oct. 2, 1995, now Pat. No. 5,867,818.

(51) Int. Cl.
*G10L 21/00* (2013.01)
*G06F 9/455* (2006.01)
*G06F 9/44* (2006.01)

(52) U.S. Cl.
CPC ........................................ *G06F 8/30* (2013.01)

(58) Field of Classification Search
None
See application file for complete search history.

(56) References Cited

U.S. PATENT DOCUMENTS

| 3,810,118 | A | * | 5/1974 | Kiffmeyer | 700/1 |
| 4,180,862 | A | * | 12/1979 | Seipp | 700/1 |
| 4,200,916 | A | * | 4/1980 | Seipp | 710/266 |
| 4,500,993 | A | * | 2/1985 | Jacobson | 714/43 |
| 4,991,217 | A | * | 2/1991 | Garrett et al. | 704/235 |
| 5,668,978 | A | * | 9/1997 | Yasutake et al. | 703/26 |
| 5,867,818 | A | * | 2/1999 | Lam | 704/270 |
| 5,956,683 | A | * | 9/1999 | Jacobs et al. | 704/270.1 |
| 6,105,119 | A | * | 8/2000 | Kerr et al. | 711/219 |

* cited by examiner

*Primary Examiner* — Angela A Armstrong

(57) ABSTRACT

Table format programming method suitable for use with multiple languages and download through internet and network environments provides an optional table (103, 200) to define custom expressions, an optional table (105, 260) to specify multitask applications, an optional table (104, 230) to specify printing style of labels and a table of configuration states (113) which interact with a table of paths (116). An optional qualifier table (112) defines qualifying conditions of an input configuration state. Hardware embodiments includes a coprocessor to handle the table format programming process and relieve the main processor for other applications. During programming, programmers provide user defined labels to describe the function and action desired. The labels are then further developed in additional groups of program.

91 Claims, 11 Drawing Sheets

Custom Expression: MySign  —201    210          200
(&&) = (AND)           204
202    203              // logical AND function
( ‖ ) = (BIT OR)        // bit to bit OR function
205
( ; ) = ( // )          // comment notification
206
207  (++) = (INC)       // increment (!=) = (UNEQ)           // not equal
208
---        ---          ---

( % ) = (REM)           // remainder
209

Path_DisplayA_1:    RegisterA (C:&&) 00001111; Display:RegisterA

Path_DisplayA_2:    A: (RegisterA & 00001111); Display:RegisterA
217

Figure 2B 231  232  230

Identification Style: MyStyle
// This portion defines the style and appearance of either labels or keywords.
                                                                    233
234
  Case = Title    // select title case for keywords
         235
    Style = bold, italic, underline  // define identified wordings to be of
                                     // bold, italic or underline type
239   240

Figure 3

| | | | | | 260 |
|---|---|---|---|---|---|
| 261 | 262 | 263 | | 264 | |
| Task: ActiveTask | Main | Program2 | Program3 | --- | Program n |
| Task Status 1 | Start | x | x | | x |
| | 267 | 266 | | | |
| Task Status 2 | Run | Start | x | | x |
| --- | -- | -- | -- | | -- |
| Task Status m | Run | Run | Run | | Run |
| 268 | | | | | |
| Task Priority 1 | 1 | 3 | 2 | | 6 |
| 273 | | | | | 271 |
| Task Priority 2 | 1 | 2 | 6 | | 3 |
| 274 | | | | 272 | |

Figure 4

| Task: Input | Keyboard | Mouse | GamePort |
|---|---|---|---|
| All: | Run | Run | Run |
| Normal: | Run | Run | x |
| Keyboard: | Run | x | x |
| Mouse: | x | Run | x |
| Game: | x | x | Start |

| Task:Ports | COM1 | COM2 | ParallelPort |
|---|---|---|---|
| All: | Run | Run | Run |
| SrMouse: | Start | x | x |
| ExModem: | x | Continue | x |
| Printer: | x | x | Continue |

| Task:Device | CDRom | HardDriveC | Floppy |
|---|---|---|---|
| ReadCD: | Start | Run | x |
| HDFullSpeed: | x | Run | x |
| RWFloppy: | x | Run | Run |
| ALL: | Run | Run | Run |

//Possible task states: Start, Continue, Run, Pause, x

Figure 5A

| | | | |
|---|---|---|---|
| 301 Task: Input | 302 Keyboard | 303 Mouse | 304 GamePort |
| 305 All: | Run | Run | Run 310 |
| 306 Normal: | Run | Run | x |
| 307 Keyboard: | Run | x | x |
| 308 Mouse: | x | Run | x 311 |
| 309 Game: | x | x | Start |

| | | | |
|---|---|---|---|
| 321 Task:Ports | 322 COM1 | 323 COM2 | 324 ParallelPort |
| 325 All: | Run | Run | Run |
| 326 SrMouse: | Start | x | x |
| 327 ExModem: | x | Continue | x 329 |
| 328 Printer: | x | x | Continue |

| | | | |
|---|---|---|---|
| 341 Task:Device | 342 CDRom | 343 HardDriveC | Floppy |
| 345 ReadCD: | Start | Run | x 344 |
| 346 HDFullSpeed: | x | Run | x |
| 347 RWFloppy: | x | Run | Run |
| 348 ALL: | Run | Run | Run |

349 //Possible task states: Start, Continue, Run, Pause, x

Figure 5B

| 1 | Group: Main | //WebSale program main group | | | | |
|---|---|---|---|---|---|---|
| 2 | Qualifier: | | | | | |
| 3 | Catalog = Icon(1) | | | | | |
| 4 | Purchase = Icon(2) | | | | | |
| 5 | Service = Icon(3) | | | | | |
| 6 | Home = Icon(4) | | | | | |
| 7 | Quit = Icon(5) | | | | | |
| 8 | State: FirstPage | Catalog | Purchase | Service | Home | Quit |
| 9 | Ready: | P_catalog | P_purchase | P_service | Start | Bye |
| 10 | Hold1: | x | x | x | Start | Bye |
| 11 | State: Response | Group:Info | Group:Order | Group:Service | Group:Register | P3.1 |
| 12 | WindowCatalog: | Run | x | x | x | x |
| 13 | WindowPurchase: | x | Run | x | Run | x |
| 14 | WindowService: | x | x | Run | Run | x |
| 15 | Hold2: | x | x | x | x | x |
| 16 | Hold3: | x | Run | x | Run | x |
| 17 | Beep: | Continue | Continue | Continue | Continue | P+ |
| 18 | Path: | | | | | |
| 19 | Start: | CheckSystem; DisplayFirstPage; Beep; Hold 2; Ready; END | | | | |
| 20 | P_catalog: | WindowCatalog; BuySolicit; END | | | | |
| 21 | P_purchase: | WindowPurchase; Hold1; Hold3; GrayButton; END | | | | |
| 22 | P_service: | WindowService; BuySolicit; END | | | | |
| 23 | Bye: | Terminate; END | | | | |
| 24 | EOG | //Keyword to indicate end of Group | | | | |

//Note: Line numbers are for description reference and are not required in actual
//programming. States and path equations are not required to be in sequence.

Figure 6A

| | | | | | | |
|---|---|---|---|---|---|---|
| 1 | Group: Main | //WebSale program main group | | | | |
| 2 | Qualifier: | | | | | |
| 3 | Catalog = Icon(1) | | | | | |
| 4 | Purchase = Icon(2) | | | | | |
| 5 | Service = Icon(3) | | | | | |
| 6 | Home = Icon(5) | | | | | |
| 7 | Quit = Icon(4) | | | | | |
| 8 | State: FirstPage | Catalog | Purchase | Service | Home | Quit |
| 9 | Ready: | P_catalog | P_purchase | P_service | Start | Bye |
| 10 | Hold1: | x | x | x | Start | Bye |
| 11 | State: Response | Group:Info | Group:Order | Group:Service | Group:Register | P3.1 |
| 12 | WindowCatalog: | Run | x | x | x | x |
| 13 | WindowPurchase: | x | Run | x | Run | x |
| 14 | WindowService: | x | x | Run | Run | x |
| 15 | Hold2: | x | x | x | x | x |
| 16 | Hold3: | x | Run | x | Run | x |
| 17 | Beep: | Continue | Continue | Continue | Continue | P+ |
| 18 | Path: | | | | | |
| 19 | Start: | EJ_CheckSystem; EVB_DisplayFirstPage; Beep; Hold 2; Ready; END | | | | |
| 20 | P_catalog: | WindowCatalog; Lbry:BuySolicit; END | | | | |
| 21 | P_purchase: | WindowPurchase; Hold1; Hold3; Lbry:GrayButton; END | | | | |
| 22 | P_service: | WindowService; Lbry:BuySolicit; END | | | | |
| 23 | Bye: | EJ_Terminate; END | | | | |
| 24 | Library: Local | | | | | |
| 25 | BuySolicit: | EC_CheckRecord; EVC_SolicitWindow; END | | | | |
| 26 | GrayButton: | EC_CheckX; EVB_X_Is_Gray; END | | | | |
| 27 | EOG | //Keyword to indicate end of Group | | | | |

//Note: Line numbers are for description reference and are not required in actual
//programming. States and path equations are not required to be in sequence.

Figure 6B

Include:
| | |
|---|---|
| ReadIR | //Read signal from remote control |
| ReadPanel | //Read signal from control panel |
| ReceiveFromLine | //Input data from cable line |
| SendToLine | //Transmit data to cable line |
| CompressBuffer | //Compress data before send to cable line |
| DecompressBuffer | //Decompress data file |
| CompareTime | //Compare register time with real time clock |
| GenIcon | //Generate Icons onto TV screen |
| GenWindow | //Create a new window |
| InputCursor | //Input and decode movement of cursor |
| OutputCursor | //Update cursor position on TV screen |
| DisplayData | //Display data to TV screen |
| DisplayPicture | //Display picture file to TV screen |
| ...... | //...... |
| ...... | //...... |
| ErrorMessage | //Decode error code and transmit error message |
| Help | //Display help screen |

Figure 7

Include:

| | |
|---|---|
| EA_ReadIR | //Read signal from remote control |
| EE_ReadPanel | //Read signal from control panel |
| EA_ReceiveFromLine | //Input data from cable line |
| EA_SendToLine | //Transmit data to cable line |
| EC_CompressBuffer | //Compress data before send to cable line |
| EC_DecompressBuffer | //Decompress data file |
| EA_CompareTime | //Compare register time with real time clock |
| EJ_GenIcon | //Generate Icons onto TV screen |
| EJ_GenWindow | //Create a new window |
| EVC_InputCursor | //Input and decode movement of cursor |
| EVB_OutputCursor | //Update cursor position on TV screen |
| EVB_DisplayData | //Display data to TV screen |
| EVB_DisplayPicture | //Display picture file to TV screen |
| ...... | //...... |
| ...... | //...... |
| EA_ErrorMessage | //Decode error code and transmit error message |
| EVB_Help | //Display help screen |

Figure 8

| Function | Table Format Instruction |
|---|---|
| Instruction separator | |
| Identify end of instruction | |
| | |
| Continuation of Instruction | |
| Identify line continuation | & (at the beginning of a line) |
| | |
| Unary Operators | |
| Direction | VALUE (address) |
| Address | ADDRESS (lvalue) |
| Negative | - |
| Logical negation | NOT (expression) |
| 1's complement | COMPLEMENT(expression) |
| Increment | INCREMENT |
| Decrement | DECREMENT |
| Size of | SIZEOF(expression) |
| | |
| Shift Operators | |
| Left shift | BIT SHIFT LEFT (operand, n) |
| Right shift | BIT SHIFT RIGHT (operand, n) |
| | |
| Relational Operators | |
| Less than | < |
| Greater than | > |
| Less or equal | <= or =< |
| Greater or equal | >= or => |
| | |
| Logical operators | |
| Bitwise AND | BIT AND |
| Logical AND | AND |
| Exclusive OR | XOR |
| Bitwise OR | BIT OR |
| Logical OR | OR |
| Conditional branch | Expression?: [True-statement] / [False-statement] |
| | |
| Comments | |
| | // (to the end of the line) |

Figure 9

```
Input State:
Trigger Pin:    TG1         TG2         TG3         TG4         TG5     TG6
State0:         R:Path1     R:Path2     R:Path3     R:Path4     X       X
State1:         F:Path11    R:Path2     R:Path3     R:Path4     X       X
State2:         R:Path1     F:Path11    R:Path3     R:Path4     X       X
State3:         R:Path1     R:Path2     F:Path11    R:Path4     X       X
State4:         R:Path1     R:Path2     R:Path3     F:Path11    X       X Path:
Path 1:         State1  Sound1  Path1
Path 2:         State2  Sound2  Path2
Path 3:         State3  Sound3  Path3
Path 4:         State4  Sound4  Path4
Path11:         State0  End
```

TABLE FORMAT PROGRAMMING

RELATED APPLICATIONS

This is a continuation in part of U.S. application Ser. No. 08/538,426 filed Oct. 2, 1995 now issued as U.S. Pat. No. 5,867,818 and FWC of U.S. application Ser. No. 09/169,462 now abandoned. Reference is also directed to applicant's UK Patent GB2306024 issued on Aug. 24, 1999. These applications are incorporated herein by reference.

FIELD OF THE INVENTION

The present invention relates to a method to program a computing device by filling up different kinds of tables to achieve the programming function and facilitate the control of program flow.

BACKGROUND OF THE INVENTION

The present invention relates generally to a programming tool that is designed to interface between programmers and computers. This programming tool also supports a programming method that allows a programmer to make extensive use of tables as a mean to represent the logical thinking of a programmer reflected in a program written by this programming tool, and enabling the programming process easily to be understood by third parties. Thus, these improvements enhance the efficiency of programming, reduce the likelihood of the presence of program bugs or structural errors. In addition, the training cost required for a programmer to learn the programming method is minimal. The resulting programs composed with the invented method also will be easy to be read and to be maintained by any programmer.

Traditional programming languages define a set of programming instructions and programming rules. Most commonly used programming languages such as BASIC, C and JAVA are written in the form of a top down line by line listing in sequence. In many applications, hundreds of pages of codes are written to describe the job function. It is extremely difficult for a programmer to follow the logical flow of a program from a long listing. The size of programs therefore causes difficulties in subsequent maintenance work. Besides, multiple pages of programs filled with sequential lines of codes are very difficult to be understood by another programmer who has not previously involved in the job. Although many compact instructions or programming symbols had been invented, the size of many programs written in many different programming languages are still too big to be easily interpreted by a professional programmer. In many situations, the author of a program also finds difficulty to understand his or her own program after an extended period of time. The requirement of compact size in instruction set and readability contradicts to each other. It is highly desirable to have a programming method, which provides compact program size and is also simple to be understood by other programmers, preferably for the inexperienced people as well.

Every time when a new programming language is invented, coding symbols and instruction set are designed to describe a programming function. Rules are also designed to restrict how the programming instructions are to be used in order to make a program written with the language interpretable and executable by a computing device. In many situations, the instruction manual describing a programming language is over two inches thick in order to document all these instruction set and describe the programming rules. It is not unusual to require months of training effort to be required in order for a programmer to learn the whole instruction set and understand all the programming rules of a new programming language. More programming tricks are usually learned through subsequent years of programming experience.

Although many programming languages allow a program to include conditionally jump, call functions or branches to other segments of the program according to the structural requirements of the job, the logic flow of these interactive branching activities inside the program structure is extremely difficult to be interpreted by a professional programmer even though a great amount of time may have been spent in reading the program.

There are various kinds of programming languages available in the market, each dedicated to a certain kind of application, or designed according to a particular programming environment. Many other programming languages are designed to program specific hardware configurations or system. Often, different programming languages make use of different symbols or even expression strings to represent an instruction describing a similar function. A programmer may often be confused which symbols or expressions to be used, after learning many different languages, each with different format and instruction expressions. It is highly desirable to have a new programming tool enabling a programmer to overcome this difficulty.

Because most programming languages are designed optimally to interpret the programming function specific to their application environment, many programming jobs which includes a large variety of functions are best to be dissected into modules, with different modules written in different languages, according to their specific requirements. It is therefore highly desirable to have a special programming method suitable for managing the integration of program segments written in different languages. With the popularity of interne, it is also highly desirable to have a generic programming method suitable for coordinating programming modules of different format to form a combined program, which is suitable for downloading the program to individual local computers remote from the host computer. For this type of application, the program must be of compact nature and be able to self-reconfigure according to the nature of the various local computers.

Applicants issued U.S. Pat. No. 5,867,818 and UK Patent GB2306024 first introduced a primitive table format method for programming a hardware controller chip having multiple input and output terminals. The present application is directed to the various improvements achieved from the further intense research since this primitive structure was invented.

SUMMARY OF THE INVENTION

The present invention is directed to the inventive steps of providing the architecture of a generic model to program a computing device making use of the concept of table format programming. One objective of the invention is to establish a generic model of programming method to direct the operation of a computing device and structure this model such that it is simple enough to be applied by ordinary people without receiving an intensive professional training. A further objective is establish a programming model such that any program written with this format can be easily understood by another person without having extensive experience in the language or close involvement with the writing of the program. Another objective of the invention is to establish a programming model that clearly identifies the structure of a programming job through the coding process, therefore enabling the program to be maintained with minimal effort. As a result, considerable training cost to learn a programming language, time cost to write a program, the time cost to debug a program and future maintenance cost to modify the program can be reduced. With such a user-friendly programming structure, it is expected that fewer programming bugs will be included during the programming process and therefore the time cost required for debugging can also be reduced.

Another further objective of the invention is to establish a structural programming format which is able to express a clear skeletal structure of the job while enabling the individual specific functional program modules to be selectably programmed with any language most suitable for that function. This approach further enhances the efficiency of programming and reduces the amount of future maintenance work required.

The programming method of the present invention comprises the steps of filling up two or more tables with program data. Various types of tables are designed to perform different supporting functions. A table is defined as a matrix of data. A table may have one or more dimensions. A table matrix is typically represented by m row and n columns where m and n are integers equal or greater than one. Each element of the table may be represented by a label, a single expression or a sequence of expressions.

In a first embodiment of the invention, the programming method introduces the concept of a task table which comprises a table of data formed to control the activity of multiple tasks. More than one task table may be present in a program, each table comprises of one or more task states. Whenever a task state is specified in the programming process, the situation and/or activities of the tasks specified are defined. Further task priority information can be included in the activity task table or provided in another separate table for the computing device to assign handling priority while running multiple tasks with the shared resources of the computing device.

In the fundamental aspect of the invention, a table is formed to define one or more configuration states, which may include input and/or output information. When an input qualifying condition of a configuration state is satisfied, it will cause a response of a specific sequence of action represented in another table called an event table or path table. At least one configuration state is to be specified as the active state. This early version of Table Format programming method designed for micro-controllers was described in applicant's issued U.S. Pat. No. 5,867,818 and UK Patent GB2306024. The present application is directed to various enhancement of the fundamental concept resulted from years of intense research to improve the servicing scope of the technology.

In another extended embodiment of the invention, a further table is formed to define the qualifying conditions required to trigger a qualifier configuration state. In this embodiment, the concept of virtual qualifier is first introduced. A virtual qualifier is defined as any qualifying condition not coming from a physical hardware terminal. Virtual qualifier is important as it includes the consideration of a result which comes from a single software instruction or from a whole software program. Virtual qualifier may also include hardware internal to a computing device such as overflow of an internal register. It may be triggered by the result of an internal software or hardware interrupt, generation of a sign, polarity signal, signal indicated the presence of data from another system or the presence of a flag. Other commonly used example of virtual qualifier is the output of a mouse driver program which specifies the direction of motion of a pointer according to the movement of a mouse.

In another embodiment of the invention, a table is formed to define the output configuration of an output state. The output state may be a signal to be sent out through a physical hardware terminal or the configuration of a virtual computing output states. A virtual computing output state is defined to be any output state which does not describe the activity of a hardware terminal. An example of a virtual computing output state is the triggering of a software program to start running, or to set particular conditional parameter to control a software, or for the software to perform some specific function.

When a qualified trigger is obtained, a responsive action is executed. A path table or event table is a table grouping one or more responsive actions. A path may represent an action or a sequence of actions to be performed when a qualified condition is received. A path may be initiated by another path. This responsive action or sequence of action is named as a path equation. The interactive composition of state tables and path table is analogous to event structure illustrated with state diagrams. Besides, table format programming offers a program presentation which better follow the thinking of human mind and therefore makes it more user friendly. In order to better present the descriptive presentation of the program flow, each path in the path table can be assigned with a meaningful label according to the wish of the programmer. A meaningfully named label can be assigned to a configuration state or a path. All these labels helps the programmer or other people to understand the action and logic flow of the program written. This is an important contribution of the present invention to help interpret a composed program and reduce future maintenance costs.

Another table which can be included in the invented programming process directs an output condition in an output state to a specific sequence of operation. This sequence can be represented by another table to simplify the programming process.

A further type of table introduced in the present invention enables the programmer to change the expression and/or syntax of the table format programming language into any other expressions or symbols desired. Further tables which may be included define one or more sets of library or external programs required to support the programming job.

With the support of the table format programming tool, the traditional practice of programming is significantly changed. When the structural programming job is started, the programmer interactively describe the skeletal structure of the program flow with tables of states and paths. The programmer is free to assign meaningful labels or names to represent each configuration state and path. The meaningful names of each state configuration and path equation helps to describe the flow of the program. When an action to be included in a path is too complicated to be represented by the available instruction set, or the action is better to be described with a program module of another language, the programmer is free to assign a meaningful label to represent this desired action. At the end of the programming process, the programmer should furnish executable program modules or expressions for each of the undefined labels assigned. In this way program modules are formed by interactively organizing multiple groups of tables. A program module having at least a state table and a path table is named as a program group or table group. Each program group can be assigned another meaningful label to describe the function of the program module. This label can then be utilized in another program module or group for pointing to this program group when a jump or function call is required. The very first program group to be executed when the program is started by default is named as the "main" group for convenience. Inside each group, there should be a "start" up path to serve as the starting path when the program is initialized or starts from default. In order to improve programming efficiency, supporting program modules may be composed with a desirable language different from the table format programming method used in the main group. Many different languages may be utilized in the same program. It is highly desirable to design in features in the table format programming method to pass parameters and variables in between program modules of different languages. In a preferred embodiment, a table format program is designed to interface with different programming languages and serves as a bridge to communicate in between the program modules written in different languages. The program eventually composed can then be compiled or translated into a specific desired programming language, including Assembly Language or even machine code digital data. These codes can be executed by the compiling computer or to be transplanted to run in another computing device. In the later case, the compiling computer serves as a tool, or work station to compile the table format oriented program intended to run in another computing devices, such as embedded controllers, or third party computers. It can be observed that the table format programming language significantly changes the concept and practice of writing a program. A program is written under a logical and well-structured manner. By making use of the freedom to assign meaningful labels, the program flow is as smooth as composing a composition to describe the programming job. Each label is then linked with an external program module which can be written in any languages desired. From time to time, multiple levels of program groups or modules can be arranged. Because the program size of each table format group is usually quite small and the program is well structured, the aforementioned advantages of table format programming can be easily achieved.

Freedom to assign or equate labels and instruction keywords is very important for Table Format programming to support multiple languages programming platform. This is because many languages may make use of different syntax for the same kind of application. The freedom of labeling and equating feature enables the user to unify the labels and syntax according to his/her desire.

The nature of table format programming makes it a perfect supporting tool to enhance the programming structure of another language. For example, the compiler of a high level language can be modified to include just sufficient the table format programming function to provide the skeletal structural of a program written in that language.

Since the method of table format programming is unique and independent to the third language programs it coordinates, the program management job can be simplified by providing a simple table format coprocessor which handles almost all the table format programming tasks. This structure of multiple processors will relieve the workload of the main processor and allow it to focus on handling the regular jobs and improve the overall system performance, particularly in multitasking environment. The table format coprocessor can be a processor located outside the main processor or may coexist with the main processor within the same integrated circuit chip. Applicant's U.S. Pat. No. 5,867,818 and UK Patent GB2306024 substantially disclosed a table format processor specially designed to serve this application. Other microprocessors such as those advertised to be supported by Easy Format in the market can be easily converted into a table format processor by supporting with a suitable table format compiler during programming. When table format programming is applied to microprocessors, micro controllers or any other type of embedded controllers, the compiled or encoded table format program becomes digital data which is stored in memory such as ROM, EPROM or flash memory for the execution of the microprocessor or micro controller. A printed circuit assembly comprising the processor and memory storing the compiled representation of the table format program is then used to build up a finished commercial product for point of sale distribution.

In accordance with the structural organization of the table format programming, it is particularly suitable for event driven applications such as programming under a windows environment, web site, interactive game or control programming. An important characteristic of table format utilizing in event driven programming is that it is a highly compressed format to represent a program. Most table format programs for small jobs are less than one page long. Experimental results demonstrated that one page in table format programming may represent eight pages of assembly language program depends on the complexity of the available instruction set. Considerable code size saving can also be achieved when compared with many high level languages. This nature makes table format programming economical to serve as a media to communicate through a limited bandwidth communication channel; such as in between a host system to communicate with numerous local computers in the network or internet applications. It should be noted that a network, communication link or communication channel refer to any means connecting two computing devices together, including serial port, parallel port, USB port, internet, intranet, extranet, LAN and any communication means interfacing two computing devices. The devices at the two ends can be connected by wired, wireless or mixed mode connection. In internet programming, a further step is required to evaluate the system configuration of an user computer and then adjust the program settings before a down load program can be executed by the local computer. The configuration of many computer to human interface devices such as monitor, graphic card, sound generation device, pointer control, game controller control are among the configuration settings to be defined. Because the internet communication line is usually the bottle neck of a system, it is recommended that the compiling job for table format programming is performed at the local computer level in order to make use of the advantages of the compressed codes of table format programming.

FIG. 11 is a block diagram showing how a local computer 801 is connected with a remote computer 803. In many applications, a table format program is stored in the local computer. It is downloaded to a remote computer through a communication link 802 upon request. The table format program can be stored in the memory means 804 of the remote computer or immediately compiled by the remote computer. The compiled file is an executable file to perform some predefined work at the remote computer. This executable file can also be stored in the memory means 804 of the remote computer.

When a compiler is designed to handle table format programming, it is highly recommended to make use of key words to identify the nature and location of each table, and the corresponding group accordingly. Task, group, qualifier, state, path and library are exemplary keywords used to identify the functional tables in the illustrated embodiments. It should be noted that the compiling, translating, interpreting or transforming of the table format programming method includes the process of converting the table format program into any other program format such as machine language or any higher level language. The conversion process can be performed by a compiler program written in another programming language or supported by an executable table format program as well. The compiling process can be conducted at the computer running the task or at a separated computer set up for the programming development or compiling process. For the convenience of debugging, a debug tool may be configured to reference a particular location of the table format program. The corresponding location of the program is then translated into another programming language. For example, a user can simply request the transmission of a data chain in a table format program. After the table format program is translated into Assembly Language, the user is able to locate the transmission process in the Assembly code listing and then modify the transmission characteristics of the UART as desired. This debug tool is very helpful when it is preferred to fine tune a particular process in the environment of another programming language.

The concept of task table effectively extends the convenience of table format programming to multitask environment as well.

The novel features of the invention are set forth with particularly in the appended claims.

The definition of computing device refers to any device having computing capabilities, including computers, micro controllers and embedded controllers, microprocessors, printed circuit assembly comprises of micro controllers or microprocessors. In addition to computers, other supporting hardware required to support the invented technology are the debugging hardware, communication links such as cables, communications ports, hubs and networks as defined in the specification. The table format program may be displayed on display terminals, printed on printers, and encoded as digital data. The compiled or encoded digital data representing the table format program may be stored in any memory device such as RAM, ROM, disk drive, and CD ROM. All these supporting hardware may become part of the system of the subject invention. The technical terms, keywords and labels used in the embodiments are exemplary and numerous modifications, specification variations and table format rearrangements can be readily envisioned to achieve an equivalent result, all of which are intended to be embraced within the scope of the appended claims. The invention will be best understood from the following description when read in conjunction with the accompanying drawings.

In order to fully utilize the advantages of the invented technology, users are required to carefully prepare for the pre-computer or pre-programming activities. Typical pre-computer activities involves defining the programming objective, analyze the program job specification. Programming objective comprises of any kinds of acts the programmer wishes the computer to perform, such as performing a task, providing some kinds of output, through a screen, a printer or a speaker in accordance to input received, or the result of the task. Users may choose to reduce the project into Table Format coherent state diagram. The introduction of Table Format program groups enhances the clarity of program structure, it requires users to clearly identify and define the specific functional modules of the projects before start working with the table programming tool. Because of the merit of Table Format programming method, another interface specification procedure is required to document the interfacing relationship of Table Format programming groups or modules in order to allocate the programming job to a team of programmers. In the application of network communication or downloading, the pre-computer activities involves sending the Table Format program to a remote computer through a communication link or network.

The in process computer activity is performed by the Table Format compiler which translates the Table Format program into codes executable by a local computer, a target microcontroller, or a remote computer. The post-computer activity is usually a code executable by the target computer or microcontroller. This executable code can be further run by the computer or microcontroller to perform the function according to the original programming specification in order to carry out the programming objective. The compiled executable code is usually stored in memory means defined by RAM, ROM, any programmable no-volatile memory or any other storage devices commercially available. In the situation of microcontrollers to be used in consumer products, the memory means storing the compiled executable file is usually located in the article of sale rather than in the compiling computer. In this situation, the compiling computer simply acts as a development or programming system, a programming tool, a compiler or a program supplier for a remote computing device.

BRIEF DESCRIPTION OF DRAWINGS

FIG. 2A is a table defining the table format expressions to be equated to user defined expressions.

FIG. 2B demonstrated how a name is assigned to the table of FIG. 2A.

FIG. 3 is a table formed to define different printing styles of words to be identified.

FIG. 4 is an embodiment showing different task states of a task table.

FIG. 5A is an embodiment showing multiple task tables in a program.

FIG. 5B is the numbered representation of FIG. 5A.

FIG. 6A is a program showing an embodiment of a table format program group.

FIG. 6B is a further development of the embodiment of FIG. 6A.

FIG. 7 is a table showing a list of files to be included.

FIG. 8 is a further development of the table of FIG. 7.

FIG. 9 demonstrates some proposed lengthy and descriptive instruction commands to be used in table format programming.

DESCRIPTION OF THE PREFERRED EMBODIMENTS

Figure 1:
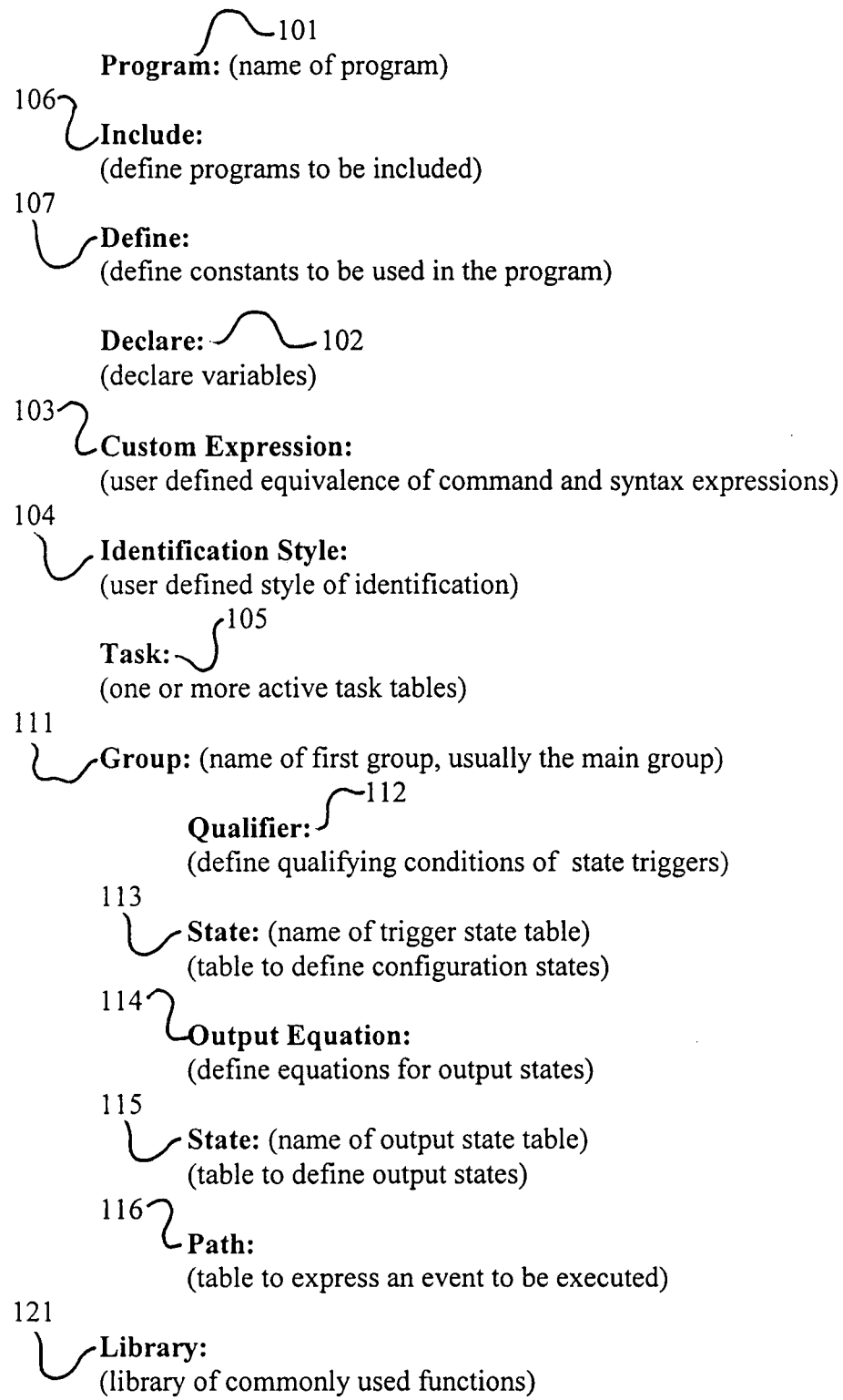
FIG. 1 illustrates the structure of an embodiment of a table format program.

Throughout the following detailed description, similar reference characters refer to similar elements in all figures of the drawings.

Figures 10, 11:
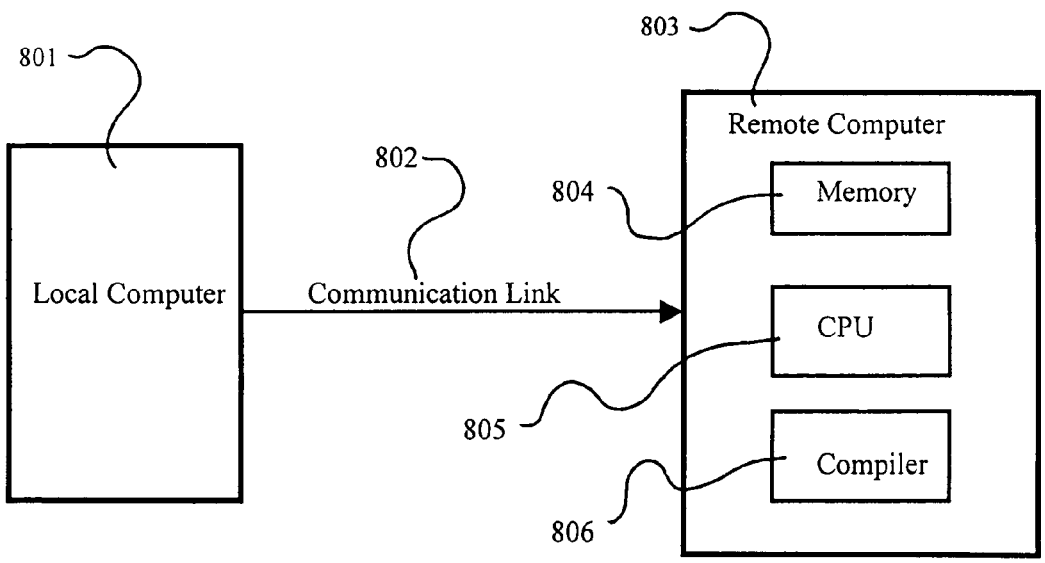
FIG. 10 demonstrates a prior art fundamental table format program suitable for use in voice generating microcontrollers.
FIG. 11 is a block diagram showing a local computer downloading a table format program to a remote computer through a communication link.

The initial attention is directed to FIG. 10 for a review of fundamental table format programming disclosed in issued U.S. Pat. No. 5,867,818. The table format program consists of two parts, a state table and a path table to program a sound generating programmable controller. In the second line of the state table, the order of the corresponding input trigger pins of the controllers is defined. Each of State0 to State 4 defines a possible trigger state of the controller. For example, the R:Path1 element corresponds to TG1 of State0 indicates that if a rising edge (represented by "R") is detected, the path named Path1 is executed. In Path1, the active state is changed to State1, then a sound named "Sound1" is generated. After the sound is completed, the control is loop back to Path1 and another round of sound generating sequence is started until a falling edge trigger (denoted by F:Path11) is received by TG1 during the State1 state. This example program demonstrates a "level hold" function of TG1 to TG4. That is, a sound is generated when one of TG1 to TG4 is compressed. The sound will be looped until the trigger button is released.

Attention is then directed to FIG. 1 which depicts the structure of a table selected in an embodiment of an improved table format program. The keyword 101 indicates the starting of a program. The name of the program can be assigned by the programmer in a position next to the keyword. Keyword 106 indicates the start of a table listing the program modules to be included. Keyword 107 indicates the starting of a table defining constants to be used in the program. Keyword 102 declares the variables to be used in the program. Keyword 103 is a table enlisting the user-defined equivalents of commands and syntax expressions. In order for the program keywords to be distinguishable, the programmer may define the keyword printing style in a table starting with keyword 104. All the above features provide the preparation work of the table format program. The task table 105 provides one or more task states to define which task are to be activated, paused or terminated. Program group 111 comprises of an optional qualifier table 112, at least one state table 113 and one path table 116. The actual program job involves interactively composing the content of the state table and the path table. Additional output state table 115 and output equation table 114 can be added to further define the output state(s) of the program. Finally, a library table 121 can be added to furnish commonly used command strings and routines. It should be noted that all the tables described above are not required to be listed in sequential order and many tables may be established to provide optional features. In addition, a program may contain multiple similar type of tables as in the situation of the task tables and the state tables. Names of the tables can be freely assigned following the colon sign of the keywords to better present the meaning of the program. Keywords used in table format programming may have more than one word and may refer to instructions, specific variables, constants and hardware elements of the system. It should be noted that the keywords provided are exemplary and alternative names of keywords can be used. Besides, some reasonable variation of the scope of the tables is always possible and are considered to be within the scope claimed in this application.

With reference now to FIG. 2A, the table 200 represents a detailed example of the table 103 of FIG. 1. The keyword 201 "Custom Expression" represents the start of this functional table which lists the user-defined equivalence of the official table format expressions. For example, assuming the official table format expression for the logical AND function is "AND" of 203; a programmer who prefers C language programming is free to substitute the table format command "AND" by "&&", 202 as taught by the C language instruction set. Custom expressions are applicable to any word or symbol set used by the language or system, such as instruction commands, symbols and system keywords. It is recommended that a comment 204 is provided every time an alternative expression is defined. The advantage of this function is to provide a personalized support to the programmer so that the familiar notation or expressions can always be used. However, when the composed program is printed, it is preferable for the compiler or editor to print out the program listing with the official expressions so as to facilitate the reading of program listing by other people. A similar application concept can be extended to a program editor. The official expression can be displayed as soon as the user-defined expression is keyed in. A switching function between the predetermined official or user-defined expression is also recommended, so the user can have a choice for the program being displayed or printed in the official form or custom form. With this custom expression defining feature, meaningful lengthy expression names can be used to make the program listing more readable by other people while keeping the advantage for the programmer to used abbreviated expressions or short length symbols to represent instruction commands and syntax. Groups of official syntax and the corresponding group of user-defined equivalent syntax and labels can be built in the table format program with the commonly known table look up method. A typical application example is illustrated in FIG. 9 where some lengthy and descriptive instruction set is shown. The shift operators "BIT SHIFT LEFT" and "BIT SHIFT RIGHT" clearly describe the operation to be performed. However, these instructions are too long and not welcome by skilled programmers. The programmer may then equate the "BIT SHIFT LEFT" instruction to the concise but less descriptive "<<" instruction used in the C language. The long instruction names make the program easily understood but too clumsy for skillful programmers. The "Custom Expression" table effectively resolve the concern while maintaining the advantages of the long instruction expressions.

Because the range of symbols available on the QWERTY keyboard is very limited, it is difficult to find sufficient meaningful symbols from the keyboard to compose a new programming method, like the table format programming method, without conflicting with traditional use of notations and symbols of some other popular languages. The custom expression table serves as a way to ease this problem by enabling users to reconfigure instructions and symbols according to their preference.

Element 210 illustrated how a name "MySign" is assigned to the "Customer Expression" table. A name is required particularly when more than one set of "Customer Expression" tables are provided to enable more than one users to manipulate or read the program. For example, in addition to the table "MySign" to be included in the program, another custom table named as "JohnsSign" can be added in the same program. If John wants to read the program, simply set the "JohnsSign" expression table as the default displaying table, and John will see the program displayed in his favorable format. The novel feature of this table is to enable every user to include their own set of custom defined expressions so as to facilitate converting or editing the program in their preferred format.

Although the table illustrated in FIG. 2A provides a method to reconfigure keywords and expressions, it is desirable to have a simple method to provide alternate expression or commands of another language for a small job. This can be achieved by specifying a symbol representing a specific language in front of expressions specified by that language. FIG. 2B illustrates how the content of Register A is to be masked with the binary number 00001111 so as to obtain the last four bits of the Register A content, and then proceed to display this number. The expression 216 provides the element "(C:&&)" to indicate that the "&&" instruction is an instruction of the "C" language. The masked value of Register A is then displayed using a predefined "Display" command. Alternatively, an expression performing the same function may be obtained by using the "&" instruction of the assembly language of a microprocessor. The sign "A: ( )" is an expression to indicate the operation included in the brackets is written in assembly language. These two methods although convenient, is not as powerful as the table of the custom expression table of FIG. 2A which personalized the expressions of a whole program is to be converted or to be personalized.

Since table format programming involves a large amount of discrete user-assigned labels, and these labels are scattered around the program and mixed with keywords and instruction commands, it is difficult for a user to read the program, since the user is unable to distinguish a user-assigned label from other keywords and instruction commands. It is therefore preferable to provide means to identify these labels to make the program more user friendly. FIG. 3 demonstrates a table of the program which controls how the user assigned labels are to be presented or highlighted. The table element 234 provides the selection of case. Typical cases available for selection are title case, all upper case and all lower case. The table element 239 indicates the choice of the letter style. Typical choices available are bold, italic and underline. It should be noted that both elements 234 and 239 offers excellent identification for all kinds of displaying device including black and white printers. Keyword 231 indicates the starting of the identification style definition section of the program. It is recommended that a user assigned name is placed after the keyword 231 to indicate that the following setting is the preferred setting of a particular person. Multiple identification style tables assigned according to the preference of different people can be included in the program and each table assigned a name as represented by element 232. A selection of one of the identification style tables as active, sets the printing style to suit the preference of the particular user reading the program.

In order to present well structured program flow in a multitasking environment, a task control table (hereafter referred as task table) is introduced in the embodiment demonstrated in FIG. 4. Element 261 is a keyword to identify a task table. Element 262 is a label assigned to name the task table. This name is provided in order to differentiate from other task table if two or more task tables are required. Elements 263, 264 represent different tasks or programs which may be run under the control of the task table. Each row of the table represents a task state. In each task state a task condition is assigned to represent the condition of each task. Listed below are some examples of expressions to describe a task condition:
Start: indicates that irrespective of whether the task or program is running, paused or had been terminated, the program is restarted from the beginning;
Continue: indicates that if a task had already been started, then it continues to run;
Pause: indicates the task or program to be paused;
Run: indicates if a task has not yet been started, it is then started; if a task or program is running, it continues to run; if a task is paused, the running of the task is resumed;
X: indicates the running of the task is terminated.

In the row 265, the task "Task Status 1" instructs the "Main" program to start running while programs 2 to n are in terminated condition. In the task state 268, all the programs are instructed to run. It should be noted that for each task table, only one task state is assigned to be active at a time. In systems with limited resources, it is important to assign priority to the active task running. The task states 273 and 274 assign priority to the tasks. It should be noted that a separated table can be established just to describe priority assigned to the tasks. Because the title elements of each element of the activity task table and priority task table are identical, it is possible to combine the two types of task tables into one as shown in FIG. 4. In this situation, two active task states are required, one for the task activity status and one for the task priority assignment.

FIG. 5A illustrates a real world application example to demonstrate the concept of the task table. FIG. 5B is the numbered illustration of FIG. 5A. This example comprises three task tables. The first task table is named as "Input" as shown in element 301. It comprises three programs named "Keyboard" 302, "Mouse" 303 and "Gameport" 304. "Keyboard" is a program scanning the keys of a keyboard. "Mouse" is a program decoding the motion of the mouse while "GamePort" inputs the triggers signals obtained from a game port. In the task state 305 named "All", all the three programs are running to enable the computing device to be responsive to all three input devices. In the task state 306 named "Normal" only the keyboard and mouse are enabled. The game port is not used so as to improve the servicing efficiency of the computing device. When in the game playing mode, the task state 309 named "Game" becomes the only active program or task. The keyboard and mouse are not used so as to let the computing device focus all its resources on servicing the game play. The second task table is a table named "Ports" 321 which controls the serial and parallel ports of the computing device. The third task table is named "Device" as shown in element 341. It controls the driver programs to operate the "CDRom" 342, the "HardDriveC" 343, and the floppy disk drive. When the task state "ReadCD" 345 is activated, the CD Rom and the Hard Drive C driver programs are activated but the floppy disc driver program is terminated. In the mode demanding full running speed of the hard drive, the task state "HDFullSpeed" 346 becomes the active task state where the hard drive becomes the only running device. According to this application example, it is recommended to group only similar nature or interrelated tasks to form a common task table. It should be noted that only one task state from each task table is to be assigned to be active at any time.

With reference to FIG. 6A, a main group of table format program is demonstrated. The program is named as "WebSale" which provides the skeleton structure of a sales program to be provided through the interne. This example illustrates the concept of multiple languages programming under the table format programming environment. The line numbers of the program are only inserted to facilitate the description of the embodiment. It should be noted that the states and path equations are not required to be in sequence. Attention is now drawn to line 1. A keyword "Group" indicates the starting of a table format group or program module. The name of the group is "Main". Main is assigned as a key word to indicate that this group is the first group of programs to be executed when the program starts to run. Line 2 starts with a keyword "qualifier" which defines the qualified conditions of the qualifiers enlisted in a configuration state. In lines 3 to 6, the term "Icon" applies to a functional command which constructs an icon and provides a trigger to the configuration state when this icon is clicked. In a typical arrangement of table format programming icons are numbered serially. Each icon is defined and named in the qualifier table. As an example, when Icon(1) is equated to the name "Catalog", the word "Catalog" is assigned and displayed to the first icon. In fact, once a name is assigned to an icon, the number it carries is immaterial unless it the term "icon(n)" is mentioned in a program and "n" is a result of a computation. Line 8 defines an input states configuration table named "FirstPage". There are five qualifiers assigned in this table namely "Catalog", "Purchase", "Service", "Home" and "Quit". Each qualifier refers to the trigger of an icon as defined in the qualifier table of line 2. The first input qualifier state is named "Ready" as in line 9. In this state, when a qualified trigger representing the icon "Catalog" is received, the path named "P_catalog" is executed and similarly for the other qualifiers. The other input configuration state is named "Hold1" as indicated in line 10. An "x" in the state equation indicates that the corresponding qualifying condition is in a don't care condition, for which a trigger is blocked or no response is required when a qualified trigger comes in.

Attention is now drawn to line 11 of FIG. 6A which provide another configuration table named "Response". It is an output states configuration table with five elements. The first four elements come with a keyword "Group:" indicate a program composed as a group. The name of the group assigned following the colon sign. The first group is named "Info" which provides product information. The second group "Order" is a program which guides the user through a purchasing process such as registering a credit card number, product number, order quantity, total amount, options, then encrypts the data and send the order to the supplier for decoding. The third group "Service" provides general interactive customer service facilities. The forth group "Register" registers the customer information. The last element of the output configuration is a hardware port P3.1 which connects to a speaker of the computing device. When a code P+ is assigned to this port, a burst of positive going pulses is sent to the speaker and a beep tone is heard. Port P3.1 is a hardware terminal and is therefore classified as an hardware oriented output. All the first four groups are software oriented output conditions and are classified as virtual computing outputs. Any output condition not related to a hardware output terminal is defined as a virtual computing output. The definition of virtual computing output includes any non-terminal related activity which generates data, displays or produces signals or information, initiates a program, resets a program, starts a software timer or counter, or manipulates an internal circuitry such as a register etc. Lines 12 to 17 are the output states configured under the state table "Response". When a "Run" command appears in an output configuration state, the corresponding group program is run. When a "Continue" instruction is received, a running program continues to run or the program remains idle if it had not yet been started or in a pause condition. The "x" sign indicates no output action is required. With all these description, the action of the output states in lines 12 to 17 are self explanatory. It should be noted that more than one input or output state table may be present in a program. Multiple state tables simplify the structure of the tables and make the programming job easier. However, it should be noted that only one of the configuration states of every input state table should be specified to be active at a time. As a programming trick, the interrelated inputs qualifiers and output conditions can be combined to form a state table. It should also be noted that input states and output states can also be combined to form a mixed state if desirable.

Line 18 starts the action "Path(s)". Each path defines one or more actions to be executed when the path name is recited in any qualifier element of a configuration state. Line 19 is a path named "Start" which is the default starting path when the Group is executed. The programming procedure starts by reciting the desirable action when the program is first started. The starting action "CheckSystem" checks the configuration of the local computing system such as the display drivers, physical port to drive the speaker and the system resources available to run the program. The resources available in the local computing devices to be evaluated includes the computer time, number of registers, amount of memory available, memory configuration, timer and counters occupied, interrupt channels available and any specific hardware circuit configuration. Included in the "CheckSystem" action should be a procedure to reconfigure the down loaded program according to the parameters of the system. The next step is to display the first page. This action is simply defined as "DisplayFirstPage" in the program. A "Beep" sound is then generated. "Hold2" indicates all output configurations are put on hold as directed by the "Response" state table. The "Ready" instruction initiates the "Ready" state of the input state table "FirstPage". During the "Ready" state, whenever a qualified trigger of the icons "Catalog", "Purchase" or "Service" is received, one of the corresponding paths 20 to 22 is executed. In each of these paths, a window directing the action is displayed and a further sales promotion program can be started. "BuySolicit" is an interactive program to solicit sales of the company products. During the path "P_purchase", the actions "Hold1" and "Hold3" limits the response allowable from the local user terminal to the icons "Home" and "Quit". The "GreyButton" is an action to change the color of the icons which are disabled such as the icons "Catalog", "Purchase" and "Service" as directed by the state command "Hold1". When the path "Bye", line 23 is executed, the program "Terminate" run and the program is ended. A keyword "EOG" which means "End Of Group" is placed at the end of the group to inform the compiler that the program group ends here.

It can be observed that the programming method discussed interactively describes the activities of the program according to the composed states and paths. Meaningful programmer-assigned terms such as "Beep", "CheckSystem" and "Terminate" are used. This procedure is as natural as writing an essay to precisely describe the actions required by the program.

In compiling this program, many programmer-assigned terms remain unidentified such as "CheckSystem", "DisplayFirstPage" and "BuySolicit". All these programmer-assigned labels are not executable by the computing device unless they are further linked to an executable program. A next step demonstrated in FIG. 6B is then required to further define the description of the unidentified labels. Typical methods to make these labels executable is to link them to an external executable program or further define the label with a program derived from a library. It is very desirable that the compiler provides a function to identify all programmer-assigned labels. The identification is preferably distinguishable when the program is printed by a black and white printer. Typical preferable identification methods include a change of case styles, and font style such as bold, italic, or underline. The requirement of each of the unidentified label is then analyzed and a most appropriate programming language is selected to compose a program to provide the desirable action.

The supporting programs can be written in any languages or even by another table format program. These supporting programs are then "Included" in the program for the compiler to put the programs together. In line 19 of FIG. 6B, it indicates that the "CheckSystem" is preferably a program written in Java as denoted by the prefix "EJ" where "E" means it is an external program to be included. The action "DisplayFirstPage" is preferably written in Visual Basic. In line 19, the action "BuySolicit", a window to solicit purchasing is preferably derived from a local or global library. Line 24 indicates the starting of the local library. Line 24 is a further elaborated path equation which describes the action to solicit the customers. This action includes executing an external program "CheckRecord" written in "C" and a program named "SolicitWindow" written in Visual C++ to interactively solicit the customer to buy products. The element "GreyButton" in line 21 refers to a path positioned in the local library which comprise a "C" program to identify which icon is assigned an "x" and then another program written in Visual Basic to turn these icon into a gray color to indicate that these icons cannot be triggered.

When an abundant library of supporting programs is built up, a programmer familiar with table format programming may start the programming job by selecting and including various common supporting programs. FIG. 7 indicates an exemplary include table when a program involving windows and transceiver is to be composed. The supporting programs in this include table are mandatory and therefore it is desirable for the compiler to outline any included program not being used in the composed program. FIG. 8 is the equivalence to the Include Table of FIG. 7 in response to the program indicated in FIG. 6B to indicate the nature of the programs to be included. "E" indicates the program is an external program. "A" indicates the program is an Assembly language program. "C" indicates the program is written in C language. "J" indicates the program is written in Java, "VC" indicates the program is written in Visual C and "VB" indicates the program is written in "Visual Basic". The prefix helps the computer to identify the decoder, interpretator or compiler to be utilized to process the program.

There are more technical requirements to make use of the table format programming method to administrate the supporting programs written in other languages, such as the method to pass parameters and equate variables between the programs. Proper management of the different types of program is also to be considered especially if they are to be translated by different compilers. Those skill in the art will appreciate the advantages provided by the table format programming method disclosed and be able to set up a compiling system to complete the actions required. For example, predefined registers or memory blocks may be assigned to handle passing of a parameter when a particular external program is included. In addition, a management program is required to handle the assignment and release of computing resources when different functional modules or different languages are included in the program.

Attention is now drawn to the following major advantages of table format programming summarized from the teaching of the above demonstrated examples:

1. The program can be composed easily by writing descriptive labels.
2. The program is well-structured so that the chance of incorporating program bugs is small.
3. It is simple for hardware terminals to be combined with virtual software outputs and interact with sophisticated program flow.
4. The table format program provides a clean-cut presentation and can easily be read by any third party. The user-friendly presentation and the clarity provided are important to further reduce program debug time and also minimize future maintenance cost.
5. Table format programming method offers great simplicity to structure a program by making use of multiple languages. These languages are selected according to the application environment and features offered by each language.
6. The concise program written in table format provides a high data compression ratio and makes the program ideal for transmission from a remote host terminal to a local computing device through a communication channel of limited bandwidth and data handling rate.

The preferred embodiments of the invention described herein are exemplary and numerous modifications, specification variations, table rearrangements, instruction and keyword assignments can be readily envisioned to achieve an equivalent result, all of which are intended to be embraced within the scope of the appended claims.

What is claimed is:

1. A system comprising a compiler computing device and a compiler or transforming program, wherein said system is configured for a programmer to program a first computing device comprises at least a first and a second table, wherein said first table comprises a first plurality of configuration states, at least one of said configuration states defining one or more qualifying conditions; wherein said second table is configured to specify a second plurality of paths, at least one of said paths being executed when a qualifying condition listed in said first table is satisfied; and one of said configuration states being specified as an active state; characterized in that said system further comprises one or more of the following elements or characteristics:

(1) at least one of said configuration state comprising a virtual qualifier;
(2) at least one of said second plurality of paths having one or more labels, wherein each label represents an executable program;
(3) one or more further tables specifying user-defined custom expressions to represent corresponding predefined instructions of a programming language;
(4) said first computing device being a remote computer connecting to a second local computing device through a communication link; wherein the digital data representing said first and second tables is stored in said remote computing device for downloading to said local computing device through said communication link;
(5) said first computing device comprising at least a first processor and a second processor; wherein said first processor is configured to translate the relationship between said first and second tables and to give direction to the second processor to execute other programs;
(6) at least one of said configuration states comprising a label and said label being equated with a separate expression defining the qualifying condition represented by said label;
(7) a table defining a preferable style of keywords;
(8) a table having a third plurality of task states to define the activity of a fourth plurality of tasks;
(9) a table defining a fifth plurality of output expressions, each output expression representing an output condition of a configuration state or a path element listed in said second table;
(10) a further state table defining a sixth plurality of configuration states and a further path table defining a seventh plurality of paths; wherein said first and second tables are grouped as a first table group to perform a first function, said further state and path tables are grouped as a second table group to perform a different second function;

said system is further configured for said compiler computing device and said compiler or transforming program to transform the configuration states and paths programmed by said programmer into codes executable by said first computing device; and wherein said system further comprises at least one of the following hardware:

(a) a computing device configured to compile said first and second tables;
(b) a tool or work station provided to compile said first and second tables;
(c) a computing device running the task compiled from said first and second tables;
(d) a debugging hardware;
(e) a communication link;
(f) a printer configured to print a program represented by said first and second tables; and
(g) a display device configured to display elements of said first or second tables.

2. The system of claim 1 wherein said tables and/or elements are configured by a programmer in accordance to a preprogram objective, and to be translated into a program executable by said computing device to deliver said preprogram objective.

3. The system of claim 1 wherein the computing device of hardware (a) compiles said first and second tables into codes executable by said first computing device.

4. A system comprising a computer accessible memory means or medium storing a computer program; wherein said computing program is configured by a programmer in accordance to a predefined programming objective for executing by a computing device to deliver said programming objective; said computing program further comprises a first table having x configuration states, at least one of said configuration states is configured to define one or more qualifying conditions;

a second table specifying y paths, at least one of said paths is executed by said computing device when a qualifying condition enlisted in said first table is satisfied; said computing program further comprises at least one of the following tables:

(1) a table specifying user defined custom expressions to equate the corresponding predefined instructions of a programming language;

(2) a table defining preferable style of keywords;

(3) a table having m task states to define the activity of n tasks, at least one of said task states specifies k selected tasks to be active;

(4) a table having p task states to define q tasks, at least one of said task states specifies the priority of the active tasks to be serviced;

(5) a table defining x qualifying expressions, each qualifying expression represents a qualifying condition of a configuration state; and (6) a table defining y output expressions, each output expression represent an output condition of a configuration state or a path element enlisted in said second table.

5. The system of claim 4 further comprising a compiler provided for compiling said computer program into data executable by said computing device.

6. The system of claim 5 wherein said data is further embedded in said computing device and said computing device is installed in an article of sale.

7. A programming method for a programmer to program a computing device comprises the steps of:

(1) providing a system for said programmer to specify x configuration states;

(2) specifying one or more qualifying conditions to at least one of said x configuration states;

(3) configuring said system to specify y paths to be executed by said computing device;

(4) assigning z labels to represent one or more of the path elements of step (3) wherein z is an integer equal or greater than one;

(5) for each qualifying condition of step (2), specifying a path to be executed by said computing device when a specific qualifying condition is satisfied;

(6) specifying at least one of the configuration states to become the active configuration state;

(7) for each assigned label of step (4), defining an executable program to be represented by said label;

(8) transforming, by a compiler or a transforming program, the configuration states and paths programmed by said programmer into codes executable by said first computing device; and (9) providing at least one of the following hardware to work with said steps (1) to (8):

(a) a compiling computing device configured to compile said configuration states and paths;

(b) a tool or work station provided to compile said configuration states and paths;

(c) a computing device running the task compiled from said configuration states and paths;

(d) a debugging hardware;

(e) a communication link;

(f) a printer configured to print a program represented by said configuration states and paths; and (g) a display device configured to display elements of said configuration states and paths.

8. The programming method of claim 7 wherein the label of step (4) is not initially executable by said computing device and the additional step (7) is configured to enable the execution of said label by said computing device.

9. The programming method of claim 8 further comprising a step to identify a label not executable by said computing device for the composing of the program of step (7) thereof.

10. The programming method of claim 7 wherein the program of step (7) is composed by any available programming languages or a table format programming language.

11. The programming method of claim 10 further comprising a step to define means to pass parameters between the program represented by the steps (1) to (6) and the executable program represented by the label.

12. The programming method of claim 7 further comprising a step to specify one or more output conditions to at least one of said x configuration states.

13. The programming method of claim 7 wherein at least an output condition is specified in a path or in a configuration state.

14. The programming method of claim 7 further comprising a step to specify resources of said computing device required to service the states and paths thereof.

15. The programming method of claim 7 further comprising a step to indicate the resources of said computing device available for composing the program of step (7).

16. The programming method of claim 7 wherein said computing device comprises of two or more processors; the resources to service the states and paths specified are provided by a first processor and at least part of the program of step (7) is serviced by the resources of a second processor.

17. The programming method of claim 7 wherein said computing device is defined as a first computing device; said programming method further comprising a step to receive digital data representing the aforementioned steps through the communication link of step (9)(e) from a second computing device locating remote from said first computing device.

18. The programming method of claim 7 wherein at least part of said steps are organized into a table format.

19. The programming method of claim 18 further comprising a step to group the configuration states of step (1) and (2) into one or more tables.

20. The programming method of claim 18 wherein the configuration states or paths are not necessary to be enlisted in sequential relationship to each other.

21. The programming method of claim 7 further comprising a step to transform the specifications of the configuration states and the paths into digital data to be stored into said computing device for the execution thereof.

22. The programming method of claim 7 further comprising a step to transform at least part of the specification of said steps with a secondary programming language of different format.

23. The programming method of claim 7 further comprising a step to identifying the location of the program composed by said steps.

24. The programming method of claim 10 wherein the program of step (7) is a program locates external to the program composed by said steps.

25. The programming method of claim 24 further comprising a step to identify the location of said external program.

26. The programming method of claim 7 further comprising a step to organize a separated table to specify if the program composed by steps (1) to (7) is active or not active.

27. The programming method of claim 7 further comprising a step to assign a label to represent a configuration state.

28. The programming method of claim 7 further comprising a step to assign a label to represent a path.

29. A programming method for a programmer to program a computing device executing multiple programs, said programming method comprises the steps of:
  (1) providing a system for said programmer to specify n programs executable by said computing device;
  (2) defining m task states, each task state specifies k selected programs to be active, wherein k is an integer equal or greater than zero:
  (3) specifying one of the task states of step (2) to be the active task state;
  (4) transforming, by a compiler or a transforming program, said m task states and k selected programs into codes executable by said computing device; and
  (5) providing at least one of the following hardware to work with said steps (1) to (4):
    (a) a compiling computing device configured to compile said task states;
    (b) a tool or work station provided to compile said task states;
    (c) a computing device running the task compiled from said task states;
    (d) a debugging hardware;
    (e) a communication link;
    (f) a printer configured to print a program represented by said task states; and
    (g) a display device configured to display elements of said task states.

30. The programming method of 29 wherein at least one of the programs is a table format program comprising:
  x program configuration states, at feast one of said configuration states defines one or more qualifying conditions;
  y paths to be executed by said computing device; and
  one of said paths is executed by said computing device when a specific qualifying condition is satisfied.

31. The programming method of claim 29 wherein the programs of step (1) are of different languages.

32. The programming method of claim 29 further comprising a step to provide a keyword to represent the steps (1) to (3).

33. The programming method of claim 29 wherein said task states are not necessary to be listed in sequential relationship to each other.

34. The programming method of claim 29 wherein the steps (1) to (3) define a first task table, said programming method further comprising steps to define a second different task table.

35. A programming method for a programmer to program a remote computing device, said programming method comprises the steps of:
  (1) providing a system for said programmer to specify x configuration states, at least one of said configuration states defines one or more qualifying conditions;
  (2) specifying y paths to be executed by said computing device;
  (3) for each qualified condition of step (1), further specify a path to be executed by said computing device when a specific qualifying condition is satisfied;
  (4) specifying one of the qualifier configuration states to become the active configuration state;
  (5) storing digital data representing the configuration states and paths of the aforementioned steps in a local computing device;
  (6) downloading the digital data of step (5) to said remote computing device though a communication link; and
  (7) transforming, by a compiler or a transforming program, the configuration states and paths programmed by said programmer into codes executable by said remote computing device; and
  (8) providing at least one of the following hardware to work with said steps (1) to (7):
    (a) a compiling computing device configured to compile said configuration states and paths;
    (b) a tool or work station provided to compile said configuration states and paths;
    (c) a computing device running the task compiled from said configuration states and paths:
    (d) a debugging hardware;
    (e) a communication link;
    (f) a printer configured to print a program represented by said configuration states and paths; and
    (g) a display device configured to display elements of said configuration states and paths.

36. The method of claim 35 wherein said communication link of step (8)(e) is a network.

37. The method of claim 36 wherein said network comprises of the internet; intranet extranet or LAN.

38. The method of claim 35 further comprising a step to direct an element of a path to a program written in a second programming language of different format.

39. The method of claim 35 further comprising a step to evaluate the architecture of said remote computing device and a further step to configure the aforementioned steps to work with the architecture of said remote computing device.

40. The method of claim 35 further comprising a step to organize at least part of the data specified by said steps into a table format.

41. The method of claim 35 further comprising a step to store digital data representing said configuration states and paths into said remote computing device for the execution thereof.

42. The method of claim 35 further comprising a step to transform at least part of the specifications of the configuration states and the paths into a secondary programming language of different format.

43. The method of claim 35 wherein the configuration states or paths are not necessary to be listed in sequential relationship to each other.

44. A multiple processors computing system comprising a first processor interfaced with a second processor wherein said first processor is configured to provide or execute at least part of a table format program defined by m configuration states interacting with n paths; wherein said second processor processes information provided by the table format program of said first processor and wherein said table format program illustrates at least a qualifying condition of a configuration state, and for a path to be executed when said qualifying condition is satisfied.

45. The multiple processors computing system of claim 44 wherein the second processor executes programs written with a second language not in table format.

46. The multiple processors computing system of claim 45 wherein the second processor is configured to execute a program as directed by a table format program executed by said first processor.

47. The multiple processors computing system of claim 44 wherein said first and second processors are included in a single integrated circuit.

48. The multiple processors computing device of claim 44 wherein each of said processors is configured to work with a set of instructions, and at least one instruction executable by one of the processors is different from the set of instructions executable by the other processor.

49. The multiple processors computing device of claim 44 further comprising means to pass one or more parameters between said first and second processors.

50. A method for a programming tool to compose a compiler suitable for a system to compile a table format program having m configuration states and n paths, and to generate a program or codes suitable to be executed by a computing device, comprising the steps of:
   (1) defining a table format programming specification;
   (2) identifying the region representing the configuration states;
   (3) identifying the region representing the paths;
   (4) identifying at least one qualifying condition of a configuration state and link it to the path specified;
   (5) linking a configuration state A to a path quoting said configuration state A as its element;
   (6) providing a compiler or a transforming program for said programming tool to transform said configuration states and paths into codes executable by said computing device; and
   (7) providing at least one of the following hardware to work with said steps (1) to (6):
      (a) a compiling computing device configured to compile said configuration states and paths;
      (b) a tool or work station provided to compile said configuration states and paths;
      (c) a computing device running the task compiled from said configuration states and paths;
      (d) a debugging hardware;
      (e) a communication link;
      (f) a printer configured to print a program represented by said configuration states and paths; and
      (g) a display device configured to display elements of said configuration states and paths.

51. The method of claim 50 further comprising a procedure to integrate the function of steps (1) to (4) into a compiler of an existing language.

52. The method of claim 50 further comprising a procedure in step (1) to identify a keyword representing the starting of the configuration states.

53. The method of claim 50 further comprising a procedure in step (2) to identify a keyword representing the starting of the paths.

54. The method of claim 50 further comprising a step to equate an user defined expression with a specific instruction of a table format programming language.

55. The method of claim 54 further comprising a step to identify a table equating user define expressions with predefined instruction set of said table format programming language.

56. The method of claim 50 further comprising a step to identify label unexecutable according to the instruction set of said table format programming language.

57. The method of claim 56 further comprising a step to link said unexecutable label to an external program.

58. The method of claim 57 wherein said external program comprises of a program composed by any available programming language including a table format programming language.

59. The method of claim 50 further comprising a step to distinguish two or more program groups, wherein each program group comprises of at least one configuration state table and one path table.

60. The method of claim 59 further comprising a step to compile the interaction in between said multiple program groups.

61. The method of claim 57 further comprising a step to define an instruction to activate a program group.

62. The method of claim 61 wherein said instruction is represented by one or more task tables.

63. A method for a programmer to program a computing apparatus comprising the steps of:
   (1) providing said programmer a system configured to work with a programming language having a predefined Instruction set;
   (2) defining alternate expression to represent a specific instruction of the selected programming language;
   (3) composing program with said alternate expression; and
   (4) transforming, by a compiler or a transforming program, the program of step (3) into codes executable by said computing apparatus; and
   (5) providing at least one of the following hardware to work with said steps (1) to (4):
      (a) a compiling computing device configured to compile said task states;
      (b) a tool or work station provided to compile said task states;
      (c) a computing device running the task compiled from said task states;
      (d) a debugging hardware;
      (e) a communication link;
      (f) a printer configured to print a program represented by said task states; and
      (g) a display device configured to display elements of said task states.

64. The method of claim 63 wherein said programming language is a table format programming language comprising:
   x configuration states, at least one of said configuration states defines one or more qualifying conditions;
   y paths to be executed by said computing device; and
   one of the paths is executed by said computing device when a specific qualifying condition is satisfied.

65. The method of claim 63 wherein the process of step (4) is a translation process carried out by an editor, a compiler, an interpreter or a translation program.

66. The method of claim 65 further comprising the step of displaying the composed program with the translated predefined instruction set of said programming language.

67. The method of claim 65 further comprising the step of displaying the composed program with the user defined expressions.

68. The method of claim 63 further comprising a step to provide a table located inside the program for linking said alternate expression with the corresponding specific instruction.

69. A programming method for a programmer to program a computing device comprises the steps of:
(1) providing a programming tool for said programmer to define one or more virtual qualifiers;
(2) specifying x configuration states, at least one of said configuration states defines one or more qualifying conditions;
(3) defining at least one of the qualifying conditions of step (2) to represent a virtual qualifiers;
(4) specifying y paths to be executed by said computing device;
(5) for each qualifying condition of step (2), further specify a path to be executed by said computing device when a specific qualifying condition of said qualifier is satisfied;
(6) specifying one of the qualifier configuration states to become the active configuration state;
(7) transforming, by a compiler or a transforming program, said configuration states and paths into codes executable by said computing device; and
(8) providing at least one of the following hardware to work with said steps (1) to (7):
  (a) a compiling computing device configured to compile said configuration states and paths;
  (b) a tool or work station provided to compile said configuration states and paths;
  (c) a computing device running the task compiled from said configuration states and paths;
  (d) a debugging hardware;
  (e) a communication link;
  (f) a printer configured to print a program represented by said configuration states and paths; and
  (g) a display device configured to display elements of said configuration states and paths.

70. The programming method of claim 69 wherein said computing device is defined as a first computing device; said programming method further comprising a step to receive digital data representing the aforementioned steps through a communication link from a second computing device locating remote from said first computing device.

71. The programming method of claim 69 further comprising a step to specify one or more configuration states to comprise an output configuration.

72. The programming method of claim 71 wherein said output configuration defines the output conditions of one or more output terminals of said computing device.

73. The programming method of claim 71 wherein said output configuration defines a virtual computing output generated by said computing device.

74. The programming method of claim 69 further comprising a step to transform the specifications of the configuration states and the paths into digital data executable by said computing device.

75. The programming method of claim 69 further comprising a step to transform at least part of the specifications of the configuration states and paths with a secondary programming language of different format.

76. The programming method of claim 69 wherein the x configuration states and y paths are not necessary to be listed in sequential relationship to each other.

77. The programming method of claim 69 further comprising a step to provide a keyword for identifying the location of the program composed by said steps.

78. The programming method of claim 69 further comprising a step to group the configuration states of step (2) into one or more tables, and one of the configuration states in each table is specified to be active.

79. The programming method of claim 69 further comprising a step to organize a separated table to determine if the program composed by steps (2) to (6) is active or not active.

80. The programming method of claim 69 further comprising the following steps:
(9) provide a predefined instruction set to program the paths and configuration states;
(10) define alternate expression to represent a specific instruction of the instruction set of step (8);
(11) compose program with the alternate expression and
(12) configure said program to be executable by said computing apparatus.

81. The method of claim 80 wherein the process of step (12) is a transformation process carried out by an editor, a compiler, an interpreter or a translation program.

82. The method of claim 80 further comprising a step to provide a table for cross reference between said alternate expression and the corresponding specific instruction.

83. The method of claim 69 further comprising a step to specify a configuration state to be active.

84. The method of claim 69 further wherein a path is defined as a default path to be executed at initialization.

85. A programming method to facilitate a programmer to identify predetermined custom expressions in the program listing of a program for programming a computing device, said programming method comprises the steps of:
(1) defining one or more sets of custom expressions;
(2) equating the custom expressions of step 1 with a reference set of expressions;
(3) selecting a desirable set of expressions from a predetermined number of different expression sets derived from the steps (1) and (2);
(4) composing said program listing with the selected expression set; and
(5) transforming, by a compiler or a transforming program, said program listing into codes executable by said computing device; and
(6) providing at least one of the following hardware to work with said steps (1) to (5):
  (a) a compiling computing device configured to compile said program;
  (b) a tool or work station provided to compile said program;
  (c) a computing device running the task compiled from said program;
  (d) a debugging hardware;
  (e) a communication link;
  (f) a printer configured to print at least a part of said program; and
  (g) a display device configured to display elements of program.

86. The programming method of claim 85 further comprising the steps of
(7) defining x configuration states, at least one of said configuration states defines one or more qualifying conditions;
(8) define y paths to be executed by said computing device; and
(9) assign one of the paths to be executed by said computing device when a specific qualifying condition is satisfied.

87. The programming method of claim 85 wherein said custom expression set is defined by a table having a keyword.

88. The programming method of claim 85 wherein said predetermined expression set is configured to highlight user defined labels.

89. The programming method of claim 85 further comprising a step to select one of the different ways to highlight said selected custom expression set.

90. A programming method for a program tool to program a computing device responsive to one or more qualifying conditions, to execute one or more paths; said programming method minimally comprises the steps of:
 (1) defining a programming objective;
 (2) specifying x configuration states in accordance to said programming objective wherein x is an integers equal or greater than one;
 (3) specifying one or more qualifying label to at least one of said x configuration states,
 (4) directing the qualifying label of step 2 to a separated expression describing the qualifying condition or conditions represented by said label;
 (5) specifying y executable paths in which at least one path is executed in response to a qualifying condition specified by step (4);
 (6) transforming, by a compiler or a transforming program, said configuration states and paths into codes executable by said computing device; and
 (7) providing at least one of the following hardware to work with said steps (1) to (6):
  (a) a compiling computing device configured to compile said configuration states and paths;
  (b) a tool or work station provided to compile said configuration states and paths;
  (c) a computing device running the task compiled from said configuration states and paths;
  (d) a debugging hardware;
  (e) a communication link;
  (f) a printer configured to print a program represented by said configuration states and paths; and
  (g) a display device configured to display elements of said configuration states and paths.

91. A system having a first computing apparatus connected with a second remote computing device through a communication link; said system comprises:
 computing means to execute a program; and
 memory means storing digital data executable by said first computing apparatus or said second remote computing device; wherein said digital data comprising representation of a table format program having x configuration states and y paths; at least one of said configuration states defines one or more qualifying conditions; and one of said path is executed by said computing means when a specific qualifying conditions is satisfied.

* * * * *